US005483407A

United States Patent [19]
Anastasio et al.

[11] Patent Number: 5,483,407

[45] Date of Patent: Jan. 9, 1996

[54] ELECTRICAL OVERSTRESS PROTECTION APPARATUS AND METHOD

[75] Inventors: Paul J. Anastasio, Camp Hill; James M. English, Annville; John C. Farrar, Harrisburg; Ram P. Goel, Camp Hill; Bernard J. Janoss, Harrisburg, all of Pa.; Christopher J. Collins, Fremont, Calif.; Richard K. Childers, Redwood City, Calif.; John H. Bunch, Menlo Park, Calif.

[73] Assignee: The Whitaker Corporation, Wilmington, Del.

[21] Appl. No.: 317,988

[22] Filed: Oct. 4, 1994

Related U.S. Application Data

[63] Continuation of Ser. No. 949,655, Sep. 23, 1992, abandoned.

[51] Int. Cl.$^{6}$ .................... H02H 3/22; H02H 9/00

[52] U.S. Cl. .................... 361/56; 361/91; 361/111

[58] Field of Search .................... 439/608, 82, 86, 439/88, 91; 361/56, 91, 111, 126, 127, 314, 315, 324, 325, 330, 760, 806, 785–789; 338/20, 21

[56] References Cited

U.S. PATENT DOCUMENTS

| | | | |
|---|---|---|---|
| 2,707,223 | 4/1955 | Hollmann | 338/20 |
| 3,377,531 | 4/1968 | Lindsay | 361/330 |
| 4,272,754 | 6/1981 | Lou | 338/21 |
| 4,331,948 | 5/1982 | Malinaric et al. | 338/21 |
| 4,333,861 | 6/1982 | Aoki et al. | 252/518 |
| 4,371,226 | 2/1983 | Brancaleone | 339/147 R |
| 4,660,907 | 4/1987 | Belter | 339/14 R |
| 4,726,638 | 2/1988 | Farrar et al. | 439/620 R |
| 4,726,991 | 2/1988 | Hyatt et al. | 428/329 |
| 4,729,752 | 3/1988 | Dawson, Jr. et al. | 439/620 |
| 4,804,332 | 2/1989 | Pirc | 439/620 |
| 4,853,827 | 8/1989 | Hernandez | 361/330 |
| 4,911,519 | 3/1990 | Burton et al. | 350/96.20 |
| 4,977,357 | 12/1990 | Shrier | 338/21 |
| 5,011,246 | 4/1991 | Corradetti et al. | 350/96.2 |
| 5,018,989 | 5/1991 | Black et al. | 439/620 |
| 5,068,634 | 11/1991 | Shrier | 338/21 |
| 5,089,929 | 2/1992 | Hilland | 361/111 |
| 5,099,380 | 3/1992 | Childers et al. | 361/56 |

(List continued on next page.)

FOREIGN PATENT DOCUMENTS

| | | |
|---|---|---|
| 0470031 | 2/1992 | European Pat. Off. . |
| 3729013 | 3/1989 | Germany . |

OTHER PUBLICATIONS

U.S. Ser. No. 07/906,813 filed Jun. 30, 1992 to Collins et al. Abstract and drawings only.

*Electromer Drawing No. FLX–XXB001,* "Multi–Line ESD Protection Array for D–Submin Connectors", Revision E, Sep. 23, 1991; Electromer Corporation, Belmont, Calif.

*Electromer Drawings No. PCE–SM01C010,* "Specification Control Drawing", Revision TM, Apr. 11, 1991; Electromer Corporation, Belmont, Calif.

European Search Report on corresponding application; Jan. 3, 1994.

*Primary Examiner*—A. D. Pellinen
*Assistant Examiner*—Ronald W. Leja
*Attorney, Agent, or Firm*—Anton P. Ness

[57] ABSTRACT

An electrical overstress protection apparatus and method includes the provision of an overstress element (22) comprised of a lamination including a conducting ground path (26) and a dielectric sheet (30) engaging discrete signal paths (16) connected to contacts (44), the sheet (30) containing holes (32) or pores or thread or fiber interstices filled with an electrical overstress protection material (36) with the sheet thickness and hole area in conjunction with area of signal and ground paths and characteristics of the material adapted to provide breakdown and clamping voltages via a path to ground from signal contacts to ground to protect components from excessive voltage levels. Electrical connectors (40,40', 40") incorporate the apparatus in different embodiments of housing (42,42') and contact (44) configurations.

24 Claims, 4 Drawing Sheets

U.S. PATENT DOCUMENTS 5,140,299 8/1992 Andrews, Jr. et al. .................. 338/308
5,142,263 8/1992 Childers et al. .......................... 338/21
5,150,086 9/1992 Ito .......................................... 333/182
5,189,387 2/1993 Childers et al. .......................... 338/20
5,246,388 9/1993 Collins et al. .......................... 439/620
5,248,517 9/1993 Shrier et al. .............................. 427/58
5,260,848 11/1993 Childers ................................ 361/127
5,262,754 11/1993 Collins .................................. 338/21
5,278,535 1/1994 Xu et al. .................................. 338/20

ELECTRICAL OVERSTRESS PROTECTION APPARATUS AND METHOD

This application is a continuation of application Ser. No. 07/949,655 filed Sep. 23, 1992, now abandoned.

This invention relates to an electrical overstress protection apparatus and method for protecting voltage sensitive components.

BACKGROUND OF THE INVENTION

Miniaturization of electronic components, such as integrated circuits, finds extremely small conductive traces spaced on close centers to make such components vulnerable to voltage spikes or transients that represent overvoltages present in the signals transmitted to such components. Excessive voltages cause overstress to such components and result in damage or destruction, and a resulting failure of function. Excessive voltages come in many forms caused from many sources ranging from electrostatic build-up that can exceed 15,000 volts to induced voltages caused by lightning strike or an accidental engagement with a high voltage line. U.S. Pat. No. 4,726,638 granted Feb. 23, 1988 is drawn to a transient suppression assembly wherein bidirectional diodes are incorporated into an electrical connector, the diodes having voltage breakdown characteristics to shunt excessive voltage levels to ground circuits associated with such a connector. As will be discerned from such a patent, the addition of diodes and the necessary substrates associated therewith, takes up space inside the connector and requires the handling of a number of discrete components such as the diodes.

In U.S. Pat. No. 4,726,991 granted Feb. 23, 1988, an electrical overstress protection material is disclosed comprised of a matrix formed of a mixture of conductive and semi-conductive particles coated with insulating material to provide chains within the matrix which act in the presence of excessive voltage to conduct the unwanted voltage levels to ground and to clamp the related circuits at a given lower voltage. U.S. Pat. No. 4,977,357 granted Dec. 11, 1990, is drawn to a further overvoltage protection material and to an over voltage protection device that allows very small dimensional structures to be used in component overvoltage and overstress protection.

The present invention has as an object an improvement over prior art overvoltage protection devices that allows a simplification of structure, particularly for multi-contact connectors or circuits. The invention has as a further object an improved overvoltage protection apparatus or device and method therefor that provides, in a single structure, an integrated overvoltage protection applicable to multiple contacts in relation to a use in connectors or circuits. The invention has as a still further object a simple, small, readily integrated, overvoltage protection element adapted to be incorporated into electrical connectors of different configurations.

SUMMARY OF THE INVENTION

The present invention achieves the foregoing objectives through the provision of apparatus and method that features a use of a matrix material that has voltage breakdown characteristics capable of accommodating a wide range of voltages and responding rapidly to alter resistance, assuming that voltage transients above levels that would overstress components are grounded. The material is packaged in a controlled way to be inserted between signal and ground paths in connectors, circuits, and the like. The material matrix is of the type described in the aforementioned U.S. Pat. Nos. 4,726,991 and 4,977,357 having a complete description of the types of materials contemplated for use by the present invention, along with characteristics of performance. The invention features the use of a material carrier formed of a thin dielectric sheet having holes or apertures therein filled with matrix material, and laminated between signal and ground paths or electrodes that may be foils or electrodeposited areas in turn connected to signal contacts and ground contacts or elements. The resulting structure is quite thin, and through a selection of sheet thickness and hole or aperture diameter or dimension, in conjunction with the particular matrix material, characteristics related to voltage breakdown, an alteration of resistance, and capacity to handle energy may be controlled.

The invention contemplates, in one embodiment, a thin sheet of dielectric material, such as a polyester or polyimide or polyamide film, having holes punched in an array filled with matrix material to cumulatively provide the necessary surface area between electrodes, along with the necessary thickness of material and to thus provide a laminar protector that is a handleable element manipulatable as a unit and readily installed on a printed circuit board or in a connector, or therebetween. In one embodiment, the element is shown disposed on a printed circuit board with the signal paths formed by conductive traces as a part of the board and with the sheet carrying the matrix material laminated thereto and a ground path extended over the sheet of material to be in intimate contact with the matrix material. In such embodiment, a connector, including signal contacts and a ground path is applied to the printed circuit board with the signal contacts being joined to the signal paths the connector's ground path being joined to the board's ground path as by solder or other suitable interconnection techniques.

In another embodiment, the electrical overstress protection element is fitted to the connector housing, on the bottom, with the signal contacts penetrating the element and being soldered to the various signal paths of the element and the connector's ground path being soldered to the element's ground path, with the signal and ground paths forming electrodes for the element. In yet another embodiment, a right-angle version of the connector is employed with the element on the bottom surface of the connector housing.

The invention contemplates equivalent means for regulating or controlling the thickness and volume of the matrix material, such as for example, a sheet formed by weaving of threads of insulating materials such as for example silk or synthetic fiber, with the interstices forming holes to accommodate the matrix material in an appropriate thickness and volume. The invention also contemplates nonwoven fabric, and also fabric such as of ceramic or refractory fibers.

The invention will now be described by way of example with reference to the accompanying drawings in which.

DETAILED DESCRIPTION OF THE INVENTION

Figure 8:
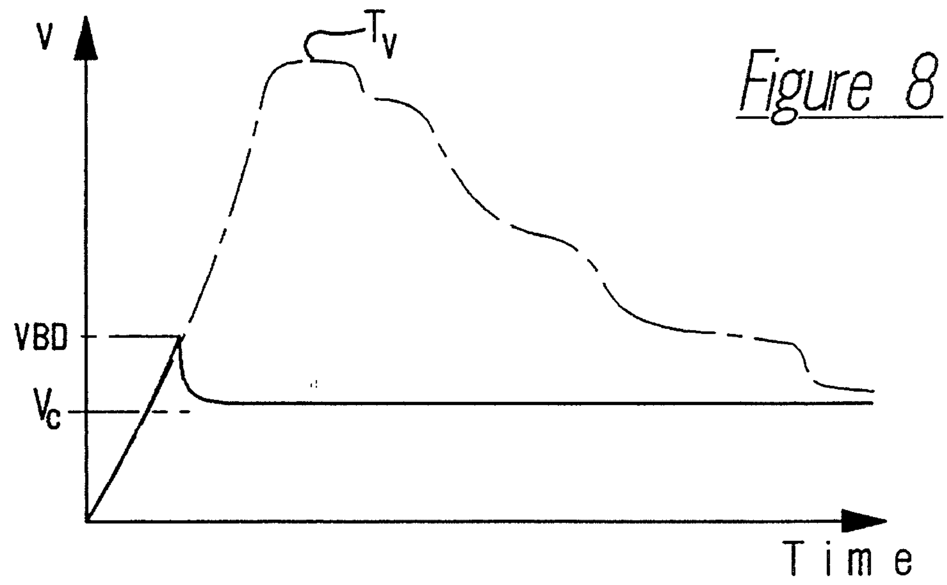
FIG. 8 is a voltage/time plot depicting the characteristics of an invention device relative to an overvoltage pulse.

Referring first to FIG. 8, a voltage/time plot is shown with a transient pulse $T_v$, which may considered to be of a voltage level and an energy content in excess to that which a given component, such as an integrated circuit, can withstand without damage or destruction. The voltage transient $T_v$ may appear on a signal line caused by a wide variety of reasons ranging from the buildup of static charges on personnel or equipment, voltages induced by lightning or accidental shorting of higher voltage supplies or devices, or voltages induced in collateral circuits due to a sudden voltage surge resulting from the closure of switches or the opening of switches to start up or shut down electrical equipment. Most typically, such voltage transients $T_v$ appear on cables or conductors and connectors utilized for transmitting signals to electronic components, such as integrated circuits that manipulate data and perform various logic functions to in turn control computational transmission equipment.

The voltage $T_v$ may be as much as many thousands of volts or as little as less than a hundred volts; electronic components, such as integrated circuits, typically operating in a range of between 3 and 12 volts, with some devices operating slightly higher. The time of response shown in FIG. 8 may represent a period as small as a few nanoseconds, with the rise time of $T_v$ representing several nanoseconds, and/or milliseconds. The area under the curve represented by $T_v$ represents the joule energy of the pulse, another necessary consideration in terms of protection from overvoltage and the resulting overstress of components. With respect to the invention, it is necessary then to examine both the need for overvoltage protection and excessive energy represented by $T_v$ for the given components being protected. Once this is done, a particular specification of protection device, in terms of voltage breakdown, to shunt unwanted transients to ground and a clamping voltage may be chosen. In FIG. 8, $V_{BD}$ represents a breakdown of voltage for a given protection device, and $V_c$ represents the clamping voltage that the device will hold indefinitely in the presence of excessive voltages.

In accordance with the invention, an electrical overstress protection apparatus or device is contemplated in the form of an element that can be applied between signal paths and ground paths, the element having characteristics adjusted in accordance with the demands for protection as illustrated in FIG. 8. In other words, the device will operate to open up a path by dropping resistance between a signal path and a ground path with a characteristic $V_{BD}$ and a characteristic $V_c$ as indicated in FIG. 8.

Figure 1:
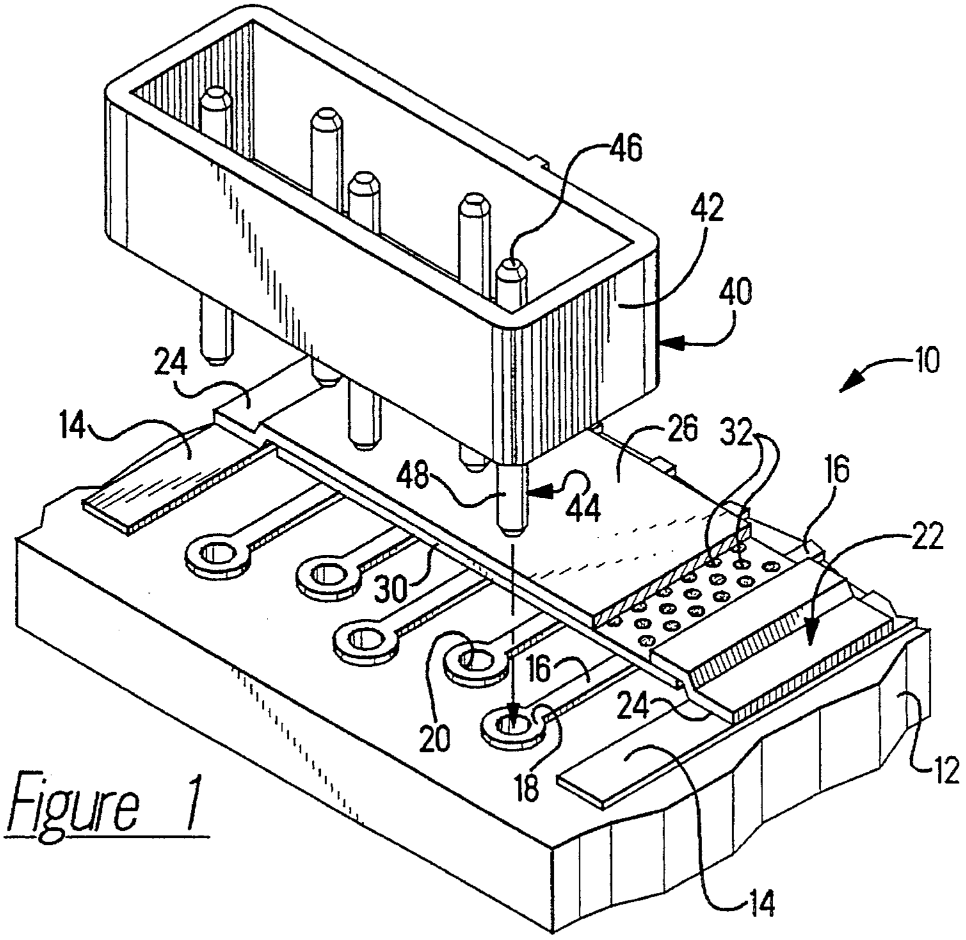
FIG. 1 is a perspective showing the invention apparatus on a printed circuit board with a connector positioned thereabove prior to installation on such board.
Figure 2:
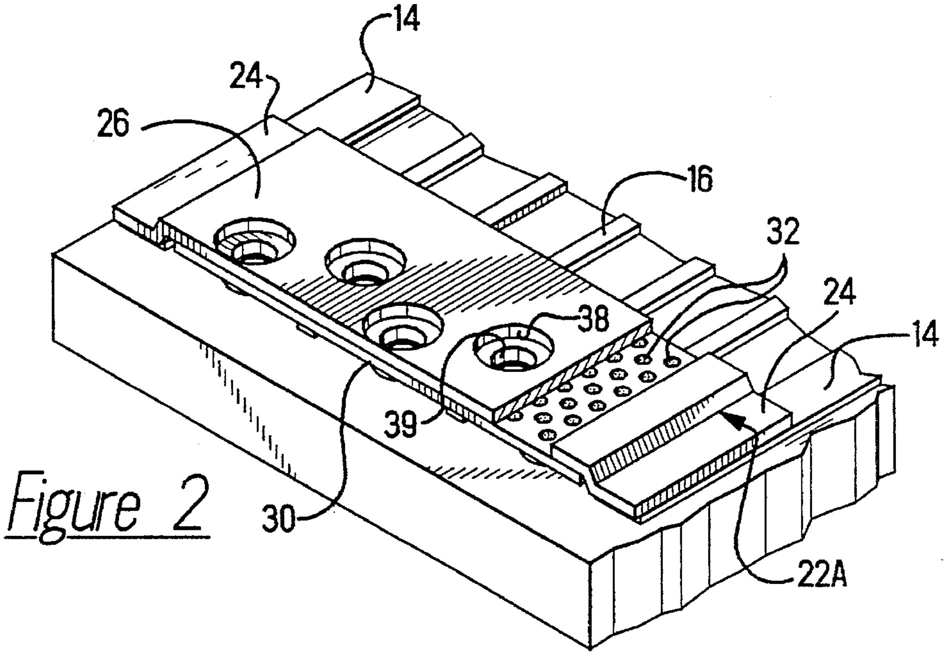
FIG. 2 is an alternative embodiment showing a different arrangement of the electrical overstress protection element in relation to a printed circuit board.

Referring now to FIG. 1, an assembly 10 is shown to include a printed circuit board 12, a connector 40 positioned thereover, and the electrical overstress protection element 22 attached to the upper surface of board 12. As can be seen in FIGS. 1 and 2, the board upper surface includes a series of conductive traces 16 and 14, typically applied thereto by etching away copper and plating the remaining material with a suitable surface finish, or through the use of silk screening or other techniques followed by electroless and/or electrodeposited materials to provide an added thickness of trace and adequate conductivity for the currents of signals carried on such traces. Traces 14 are ground buses and traces 16 are signal traces. The spacing between traces is made to provide, in conjunction with the dielectric material of the circuit board 12, an adequate voltage withstanding resistance. As can be seen, the traces 16 end in a staggered row with trace material 18 defining a conductive ring or periphery surrounding an aperture or hole 20 extending through the board. It is to be understood that holes 20 are typically plated through with tin-lead alloy to join traces within the board, in laminations in board 12 that go to and come from various components (not shown) on the board.

The electrical overstress protection element or laminar protector 22, shown considerably enlarged in terms of thickness for clarity, includes an upper conductive foil element 26 terminated at the ends 24 to the ground buses 14 on the upper surface of board 12 such as by solder or other suitable means. The foil 26 has a given area, to be further explained., and is part of a lamination that includes a dielectric member in the form of a film or sheet 30 that is positioned directly against the surfaces of traces 16 and against 26. Films such as KAPTON and MYLAR (trademarks of E. I. DuPont de Nemours & Co.) or alternate versions of polyamide, polyimide and polyester films have suitable dielectric qualities for use with the present invention. The film 30 is relatively much thinner than shown, films on the order of between 0.002 inches or slightly less up to on the order of 0.10 inches may be employed.

Figure 3:
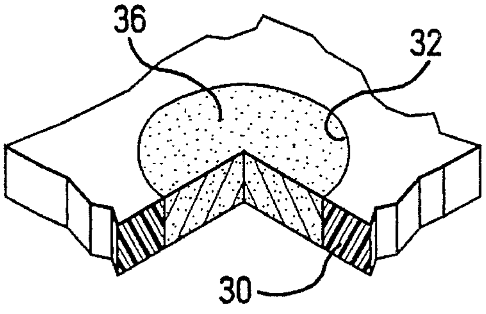
FIG. 3 is an enlarged perspective view, partially sectioned, showing a single hole of the dielectric sheet of the element of the invention containing transient suppression material therein.

Film or sheet 30 is made to have a series of apertures or holes 32 therein, as seen in FIG. 3. The holes 32 are given a diameter to define an area individually and cumulatively of the matrix of transient suppression material 36 made to fill the holes, material 36 being of a type having predefined voltage breakdown and clamping voltage characteristics as heretofore mentioned. Reference is made to the aforementioned U.S. Pat. Nos. 4,726,991 and 4,977,357 for teachings of various materials of a type that may be used for material 36.

Such material may be 40.6% polymer binder such as medium durometer fluorosilicone rubber, 1.7% cross-linking agent such as CST peroxide, 15.4% hydrated alumina and 42.3% conductive powder such as aluminum particles having an average diameter of 20 microns. Another material may be 31.5% polymer binder, 1.3% cross-linking agent, 14% hydrated alumina as above, and conductive particles such as 42.1% aluminum having an average diameter of 4 microns and 11.1% having an average diameter of 20 microns, totalling 53.2% conductive particle loading. A dielectric element similar to element 22 having such materials is further disclosed in U.S. Pat. No. 5,262,754 entitled "Overvoltage Protection Element".

In accordance with the invention concept, a connector 40, shown in FIG. 1, is brought down onto the upper surface of board 12 with the contacts 44, lower ends 48, inserted through holes 20 and soldered below board 12 to the conductive traces below and extending upward through the holes (see FIGS. 6 and 7), and therefore contacts 44 are electrically connected to the traces 16 on top of the board 12. Connector 40 typically includes: a plastic housing 42, a rectangular version being shown in FIG. 1, having contacts 44 including upper post portions 46 extending within the housing and adapted to mate with mating contacts of a mating connector connected to cable or other components or boards or the like. Contacts 44 represent signal contacts and signals are transmitted through the connector to components mounted on board 12 and interconnected to traces 16. Voltage transients $T_v$ arriving at connector 40 on contacts 44 would thus be transmitted along traces 16 to be exposed to the paths through material 36 from 16 to ground via element 22. In accordance with the invention concept, if the transient voltages exceed the design $V_{BD}$ and $V_C$ for the element 22, a low resistance path will develop between the signal paths 16 and the ground path 24,26 resulting in the transient voltages being grounded through the interconnection with ground bus 14 so as not to cause damage or destruction through overstress, either by the electric fields resulting from the voltages or by the energy content of the unwanted voltage components.

As can be appreciated from FIGS. 1 to 3, the number of holes 32, the center-to-center spacing, and the diameter of the holes and sheet thickness determine the area and volume of material 36 in contact with the grounding foil 26 and with the traces 16. The invention contemplates a selection of hole diameter and center-to-center spacing as well as dielectric sheet thickness in conjunction with the area of trace 16 and the area of foil 26 to provide a control of both volume of material 36 and area of engagement with the electrodes formed by 16 and 26. Additionally, the invention contemplates a selection of composition of the materials, the matrix materials, in conjunction with these parameters to establish a given voltage response in terms of both $V_{BD}$ and $V_C$ relative to the protection of given components.

In accordance with the invention method, the sheet 30 may be perforated by mechanically stamping out a pattern of holes 32 with the holes then being filled by drawing material over the surface with a doctor blade or a squeegee, with any excess material being removed from the upper and lower surfaces of the sheet. Thereafter, the sheet may be laminated to the foil electrode 26 with the foil electrode and lamination then applied to the printed circuit board in the manner shown in FIG. 1 and the ends 24 joined to busses 14 as by solder.

FIG. 2 shows an alternative embodiment wherein the electrical overstress protection element 22A is applied over the plated through holes of the printed circuit board (see FIG. 1), appropriate contact-receiving holes 38 being made in the foil 26 and contact-receiving holes 39 made in the sheet 30. With the embodiment shown in FIG. 2, an adjustment in the width of the traces 16, and particularly in the width of foil 26, should be made to hold the area of engagement with material 36 to that required for a given characteristic of operation.

Figure 4:
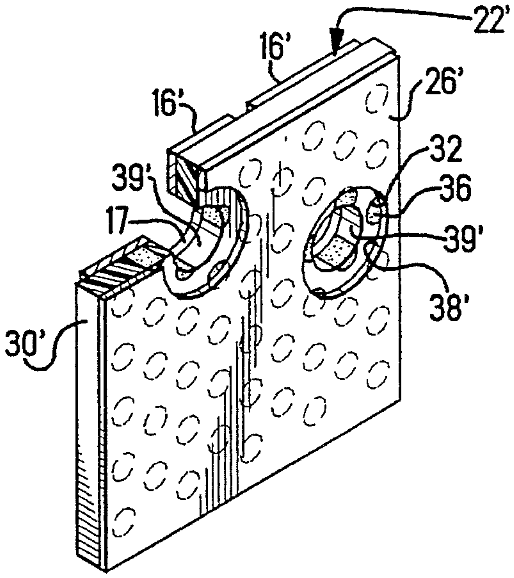
FIG. 4 is a perspective view of the element of the invention showing two contact accommodating holes.
Figure 5:
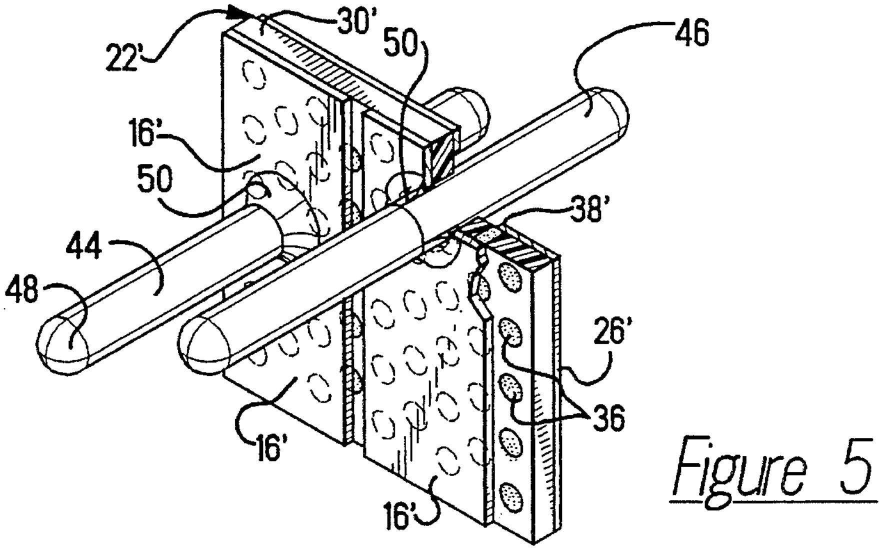
FIG. 5 is a perspective showing the element of FIG. 4 having contacts fitted therein.

Referring now to FIG. 4, an electrical overstress protection element 22' is shown as a separate entity, apart from a printed circuit board, including similar elements, however. Thus, the grounding foil 26' is shown laminated to a sheet 30' having holes 32 therein filled with material 36 and, in conjunction therewith, a series of signal paths 16' apertured as at 17, which apertures are aligned with the contact-receiving apertures 38' in foil 26' and 39' in sheet 30'. As can be seen in FIG. 5, signal contacts 44 are applied in the contact-receiving apertures of element 22' and joined as by soldering at solder fillets 50 to the signal paths 16'. The contacts 44 have ends 48 that would be fitted through corresponding plated through holes of a printed circuit board (not shown) and soldered to traces thereon and opposite ends 46 would be engaged by mating contacts of a mating connector (not shown). In use of the embodiment shown in FIG. 5, the areas of the ground path foil 26' and of the signal path 16' would be made appropriate for protection desired, independent of the areas of ground buses or signal traces on a printed circuit board. With respect to FIG. 5, it is to be understood that the contact-receiving apertures 38' are made substantially larger than the signal path holes 17 so that ground path foil 26' is not in contact with the signal paths 16' or contacts 44.

Figure 6:
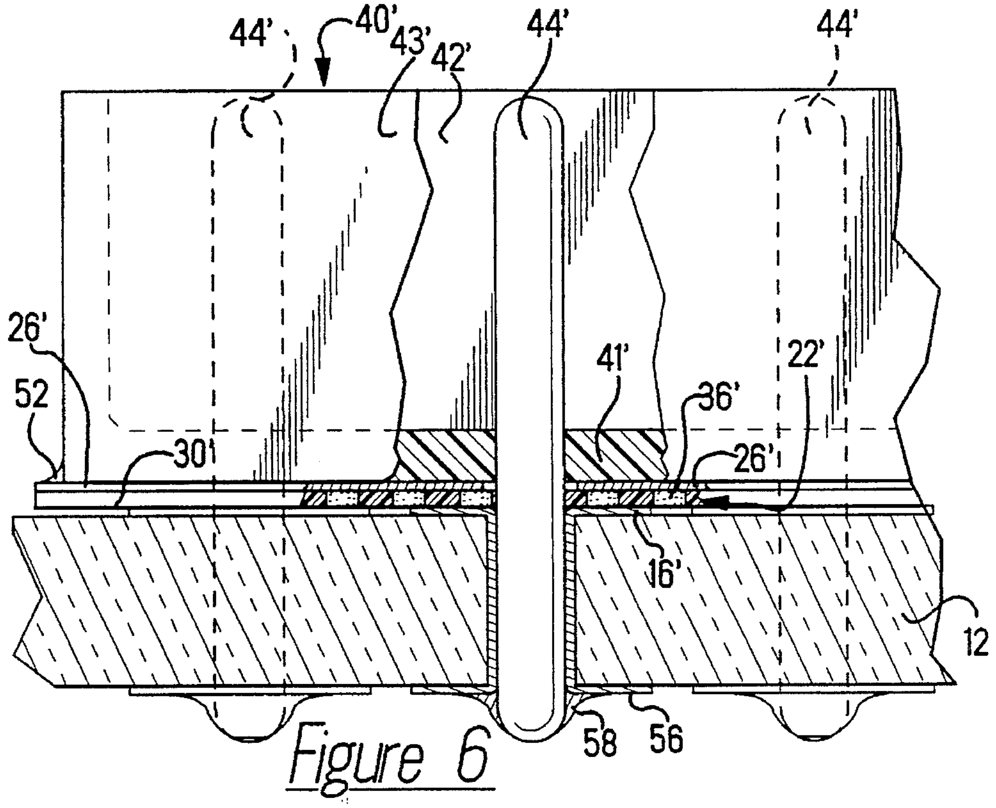
FIG. 6 is a elevational, partially sectioned view showing one embodiment of the inventive connector and element forming an apparatus relative to a printed circuit board upon which the connector is mounted.

Referring now to FIG. 6, an alternative embodiment of the invention is shown with respect to a connector 40' having a housing 42' and a grounding shield 43' extending over substantial portions of the outer surface of housing 42'. As can be seen, contacts 44' extend within the housing in a vertical sense to be engaged by contacts of a mating connector plugged into housing 42'. Housing 42' includes a base 41' through which is fitted the various contacts 44'. Against the undersurface of base 41' an electrical overstress protection element 22', like that shown in FIGS. 4 and 5, is applied; note the various elements 26', 30' and 36' in relation to the signal paths 16' shown in FIG. 6. Also note the relationship of solder interconnection of 16' to 44' and the interconnection to a signal trace 56 on the bottom of board 12 by the contact 44' through solder fillet 58. Shield 43' is grounded as by solder fillet 52 to foil 26', and to a grounding bus, not shown, on board 12.

A signal carried by contacts 44 containing an overvoltage component would result in the voltage being present on signal path 16' with the material 36 effectively grounding such voltage to the ground path via foil 26'.

Figure 7:
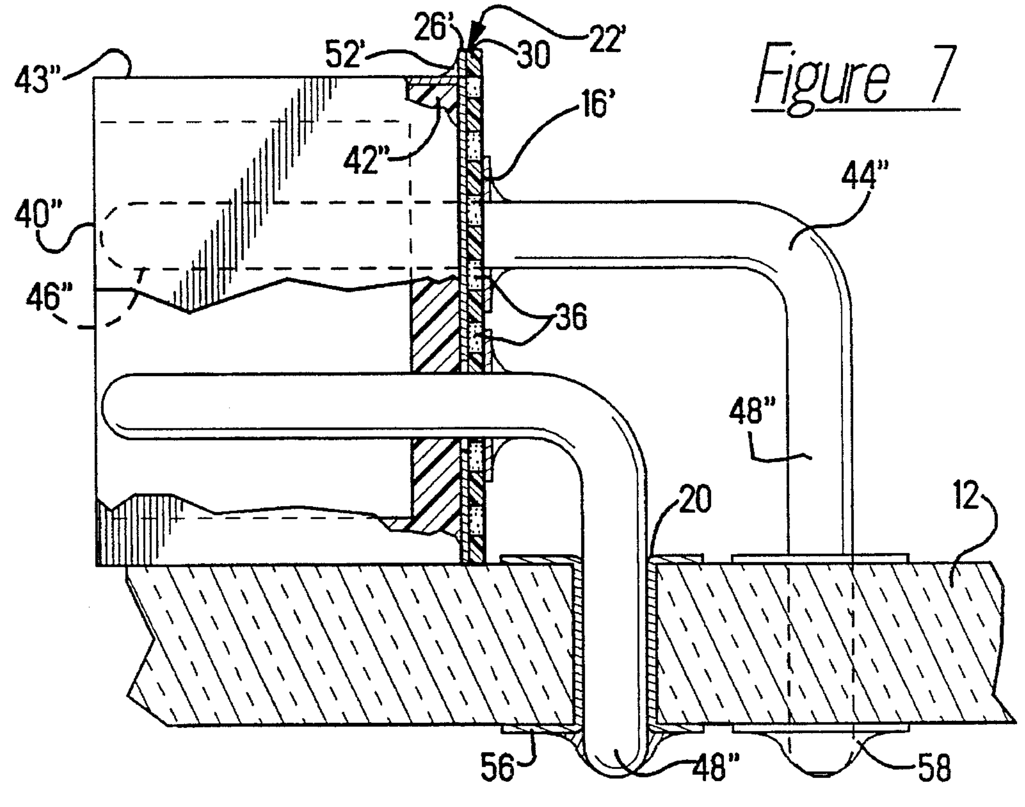
FIG. 7 is an elevational, partially sectioned view showing the connector in a different embodiment in relation to a printed circuit board.

FIG. 7 shows a further alternative embodiment in the form of a right-angle connector 40" having elements corresponding to those described with respect to the embodiment of FIG. 6, with the exception that the signal contacts 44" extend from housing 42" and are bent at right angles for lower contact ends 48" to extend through board 12 with the upper contact ends 46" parallel to the upper surface of the board and exposed in a position to be engaged by contacts of a mating connector (not shown). As can be seen in FIG. 7, the outer conductive shell 43" is joined to the bus 26' by being soldered thereto at 52' with respect to connector 40". In that way, excessive voltage levels can be carried off through ground circuits connected to the grounding shell 43".

Figure 9:
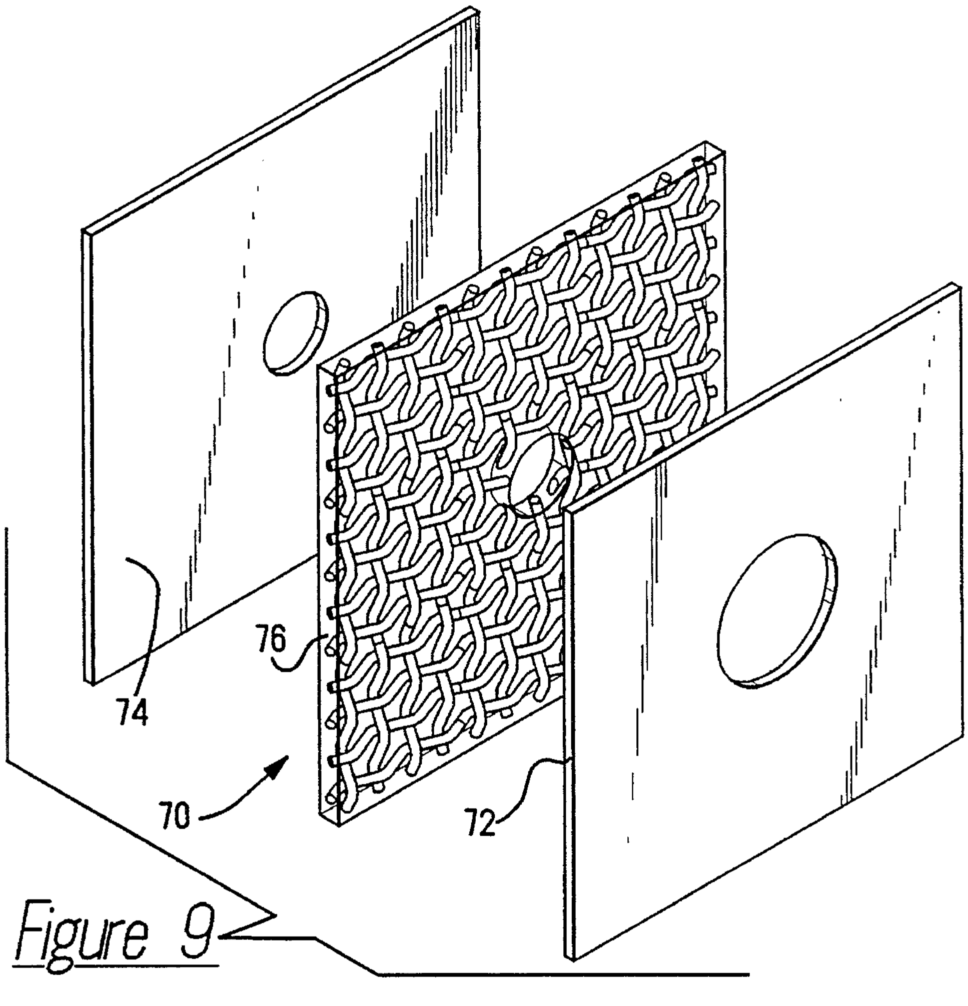
FIG. 9 is another embodiment of thin element, comprising fabric impregnated with transient suppression material.

FIG. 9 illustrates an embodiment of thin element 70 including signal and ground electrodes 74, 72 and having a fabric 76 disposed therebetween which is impregnated with material such as material 36 of FIG. 3. Fabric 76 is shown as being woven of discrete threads of dielectric material which may be synthetic material or may be of natural material such as silk, and having a thickness of between 0.001 and 0.10 inches such as preferably 0.002 inches. The transient suppression material may be impregnated into the fabric, for example, by being placed onto the fabric and being pressed thereunto by revolving cylinders of a two-roll rubber mill or a calender in up to five passes; one electrode may optionally also be pressed onto the thus-impregnated fabric by the same or similar apparatus. The material of fabric 76 may also be of ceramic or refractory material fibers and either woven or nonwoven. Such a thin element 70 is further described in U.S. patent application Ser. No. 07/949,716 filed Sep. 23, 1992 entitled "Overvoltage Protection Element".

Having now described the invention relative to preferred embodiments and in conjunction with drawings of the invention, claims are appended, intended to define what is inventive.

We claim:

1. Apparatus for use in protecting voltage sensitive components from excessive voltage levels present on signal paths connected to such components comprising a plurality of signal contacts, each contact being joined to a respective signal path formed of a thin layer of conductive material of a given area, at least one ground path formed of a thin layer of conductive material of an area at least equal to said given area and a thin dielectric sheet positioned between said plurality of discrete signal paths and said at least one ground path to form a thin laminar article, said sheet being porous and impregnated with electrical overstress protection material with the porosity size and density, sheet depth and area, and the characteristics of said material adjusted to provide a grounding connection from each said signal path to said at least one ground path through said material in the presence of a level of voltage and/or energy that is excessive to prevent damage to a component, whereby said apparatus is a discrete article having a low profile and is manipulative as a unit.

2. The apparatus of claim 1 wherein there is included a circuit board having said plurality of signal paths formed on a surface thereof and said ground path and sheet formed as separate elements applied to the surface of said circuit board to form said laminar article.

3. The apparatus of claim 2 wherein there is included a connector having a housing carrying each said signal contact as a separate element to the said circuit board with said contact connected to a corresponding said signal path.

4. The apparatus of claim 1 including a plastic housing having multiple said signal contacts disposed therein defining a connector, and further including a circuit board with multiple traces forming multiple signal paths and at least one further ground path with said housing attached to said circuit board, said signal contacts connected to the signal paths of said circuit board, and said at least one further ground path connected to each said at least one ground path.

5. The apparatus of claim 4 wherein said housing includes a grounding shield and said ground paths are connected to said shield.

6. The apparatus of claim 4 wherein said housing includes a connector ground path and has a bottom surface and said laminar arrangement is a discrete lamination fitted to said bottom surface and connected to said connector with said connector ground path connected to said at least one ground path of said laminar arrangement.

7. The apparatus of claim 6 wherein said signal contacts include portions extending from said housing through said discrete lamination and having right-angle bends to further portions to be connected to corresponding signal paths of said circuit board.

8. The apparatus of claim 4 wherein said thin dielectric sheet is a plastic dielectric film having holes formed therein.

9. The apparatus of claim 4 wherein said thin dielectric sheet is fabric of dielectric material.

10. The apparatus of claim 9 wherein said fabric is woven of silk threads.

11. In combination, an electrical connector, including a plastic housing and a plurality of electrical signal contacts, each having a first end adapted to engage a mating connector contact and a second end adapted to be connected to a circuit board carrying components having a sensitivity to overvoltage transients, and a laminar protector having a corresponding plurality of signal paths, each having a given area and connected to a respective one of said signal contacts, a plastic sheet including holes therein containing a material having desired voltage breakdown characteristics to protect said components from the overvoltage transient, and a ground path of at least said given area forming a lamination with said sheet and said signal paths with the thickness of said sheet defining adequate material thickness and volume to accommodate the excessive voltage transients in terms of voltage level and energy content to protect said components.

12. The combination of claim 11 wherein said sheet is on the order of between 0.002 to 0.005 inches in thickness.

13. The combination of claim 11 wherein said sheet is a film of dielectric material with an array of holes formed therein in number to define a sufficient area of material engagement with said signal paths and said ground path.

14. The combination of claim 11 wherein said laminar protector formed of said signal paths, said ground path and said sheet is a discrete element attached to said housing with said signal contacts of said connector connected to corresponding said signal paths of said laminar protector and said ground path connected to a ground trace on said circuit board.

15. A method of providing electrical overvoltage protection for volt-sensitive components of an electrical circuit article when electrically connected thereby to an electrical connector, including the steps comprising:

a. providing an electrical circuit article having an array of signal paths and at least one ground path of a given area all disposed in a plane;

b. providing a thin element of dielectric material having porosity and dimensioned to be superimposed over portions at least of all said signal paths;

c. at least impregnating said thin element with a material having desired voltage breakdown and clamping voltage characteristics;

d. providing a conductive element adapted to be disposed at least on a first side of said thin element, said conductive element including at least one portion exposed for connection to ground;

e. forming a lamination of said conductive element and said thin element such that a portion of said thin element complementary to said signal path portions is exposed on a second side of said thin element for connection to said signal path portions, all together defining a laminar protector; and f. disposing said laminar protector over said array of signal paths with said exposed complementary portion of said thin element overlying said signal path portions, and with ground portion connected to ground, thus establishing pairings of each signal path and the ground portion, with the material porosity size and density, the element thickness, and area of engagement selected to provide a desirable voltage breakdown and clamping voltage characteristic for each signal-ground pairing, whereby a method is defined for positioning a laminar protector onto said electrical circuit article between volt-sensitive components and an electrical connector connected thereto through the signal paths of the electrical circuit article.

16. The method of claim 15 wherein said thin element is a plastic dielectric film having holes formed therein, and said holes are filled with said material.

17. The method of claim 15 wherein said thin element is porous fabric.

18. The method of claim 17 wherein said thin element is woven of silk threads.

19. The method of claim 15 wherein said at least one ground portion of said laminar protector extends outwardly beyond an edge of said thin element, and said method further includes the step of connecting said ground portion to said ground path of said electrical circuit article.

20. The method of claim 19 further including the steps of providing a connector having a housing carrying signal contacts and a ground element, and electrically connecting said at least one ground portion to said ground element.

21. The method of claim 19 further including the step of positioning the connector adjacent said laminar protector.

22. The method of claim 19 further including the step of providing a plurality of signal contact receiving apertures extending through said elements of said laminar protector for receiving said signal contacts of said connector, said apertures in said conductive element being of sufficient size to electrically isolate said conductive element from said signal contacts upon mounting said laminar protector beneath said housing.

23. The method of claim 15 wherein said step of applying said laminar protector includes the step of providing a connector having a housing carrying said signal contacts and a ground element, and further includes the steps applying said laminar protector to a mounting face of said connector with said signal contacts through signal contact receiving apertures of said elements of said laminar protector with said apertures in said conductive element being of sufficient size to electrically isolate said conductive element from said signal contacts, and connecting said at least one ground path to said ground element for electrical overvoltage protection.

24. The method of claim 23 further including the step of connecting said ground portion to said ground path of said electrical circuit article.

* * * * *